No. 868,486. PATENTED OCT. 15. 1907.
J. J. ROLLINS.
COUPLING.
APPLICATION FILED APR. 25, 1907.
2 SHEETS—SHEET 1.
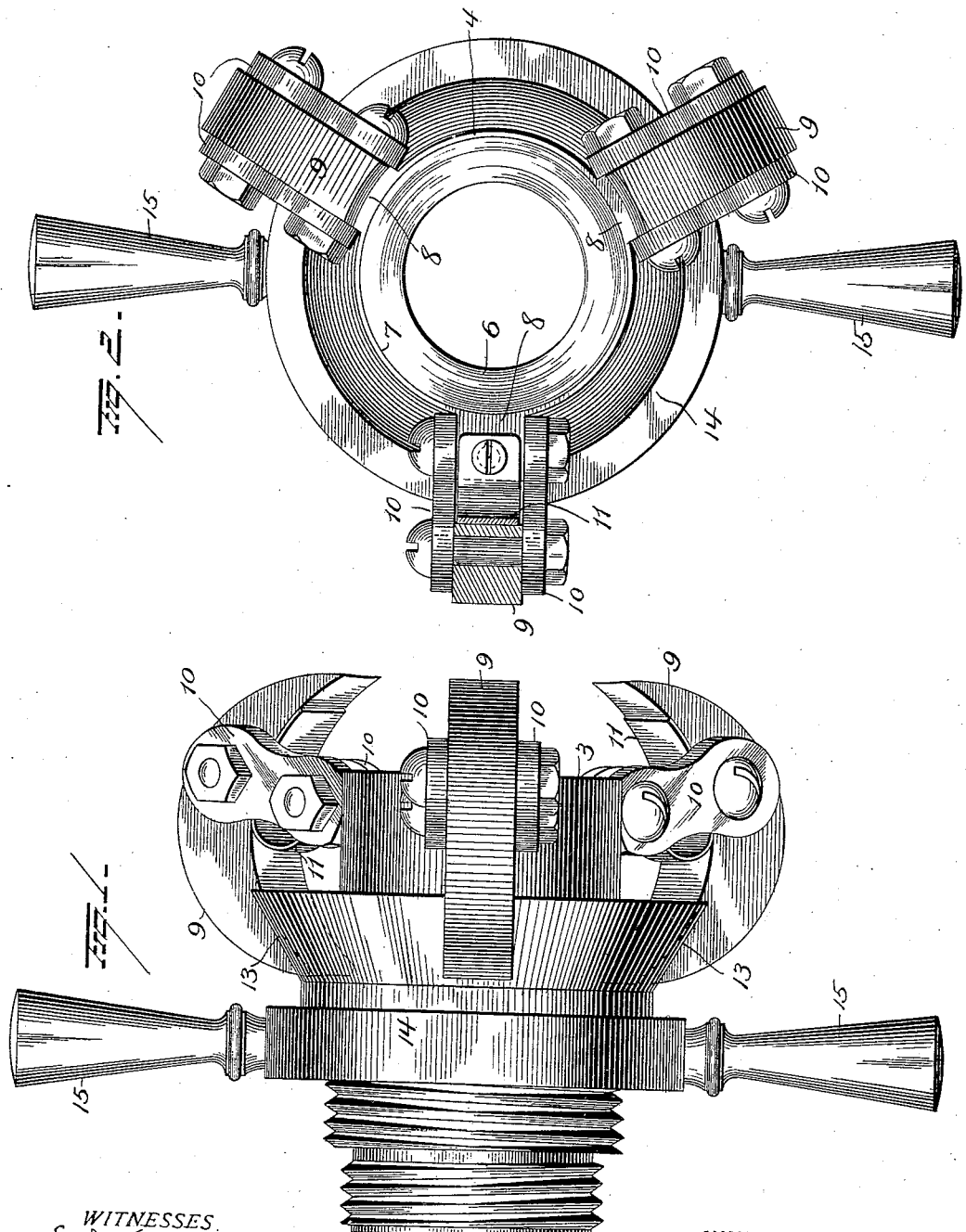
WITNESSES
INVENTOR
Attorney No. 868,486. PATENTED OCT. 15, 1907.
J. J. ROLLINS.
COUPLING.
APPLICATION FILED APR. 25, 1907.
2 SHEETS—SHEET 2.
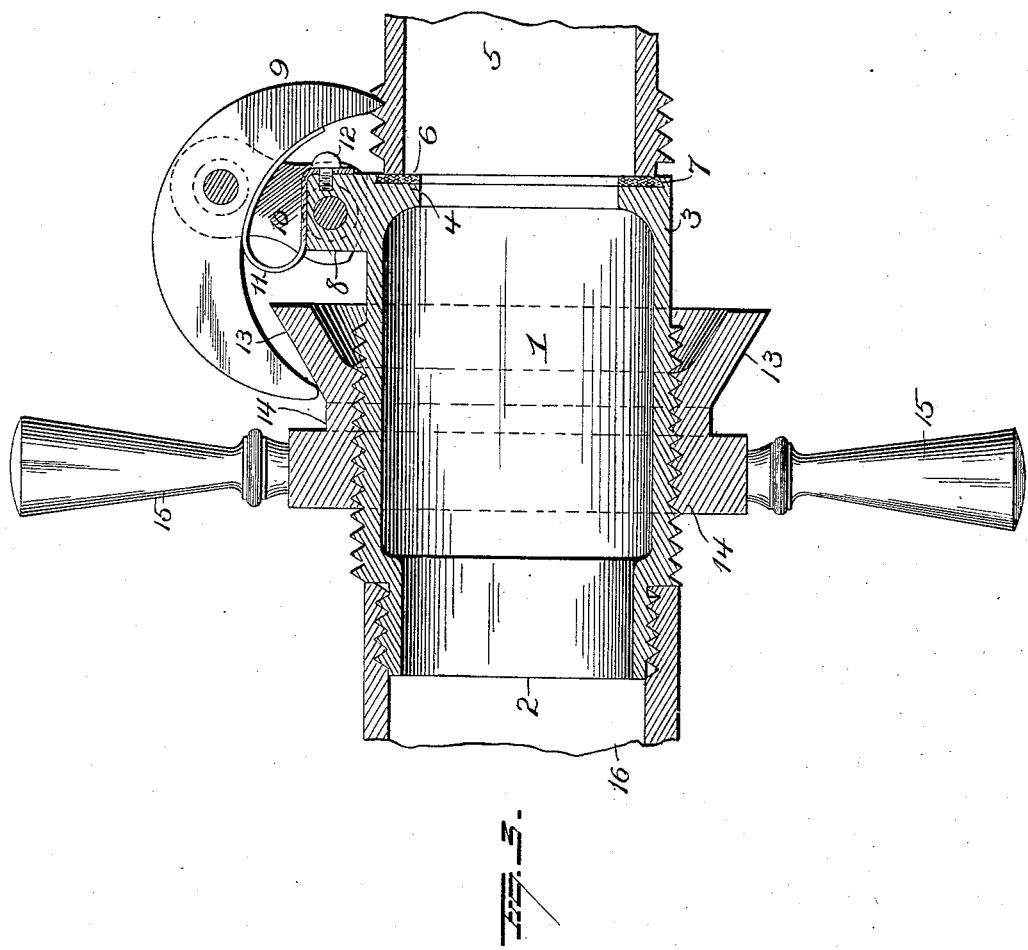
WITNESSES
INVENTOR
J. J. Rollins
Attorney

UNITED STATES PATENT OFFICE.

JAMES J. ROLLINS, OF JERSEY SHORE, PENNSYLVANIA.

COUPLING.

No. 868,486.  Specification of Letters Patent.  Patented Oct. 15, 1907.

Application filed April 25, 1907. Serial No. 370,273.

*T all whom it may concern:*

Be it known that I, JAMES J. ROLLINS, of Jersey Shore, in the county of Lycoming and State of Pennsylvania, have invented certain new and useful Improvements in Couplings; and I do hereby declare the following to be a full, clear, and exact description of the invention, such as will enable others skilled in the art to which it appertains to make and use the same.

My invention relates to an improvement in couplings designed more particularly for attaching hose to fire hydrants, the object being to provide the coupling with threads at one end to engage the hose coupling and at its other end with means for attaching it to the discharge nozzle of a fire hydrant irrespective of the size of the latter or the number of threads thereon per inch, whereby a fire hose designed for connection to a particular size discharge nozzle may be securely coupled up to different size nozzle, or to a nozzle the threads of which do not conform to the threads on the hose coupling.

With this end in view my invention consists in the parts and combinations of part as will be more fully described and pointed out in the claims.

In the accompanying drawings, Figure 1 is a view in side elevation of my improved coupling. Fig. 2 is an end view of same and Fig. 3 is a view in section showing the coupling attached at one end to a hose and at the other end to a discharge nozzle of a hydrant.

While I will describe my improvement as an emergency coupling for fire hose, I would have it distinctly understood that the coupling is applicable for coupling up hose or pipes of any kind, hence I do not limit the application of the coupling to any particular use, but claim it for any and all purposes where it can be advantageously employed.

1 represents a sleeve, one section 2 of which is screw threaded to engage the coupling of a standard hose, while the other section 3 is of greater diameter and is provided at its outer end with an enlarged bearing face 4, of sufficient area to accommodate various sizes of fire hydrant discharge nozzles 5. The end 4 of section 3 is recessed to receive a rubber or other elastic gasket 6, and is preferably provided with an annular recess 7 in which the periphery of the gasket rests and by which the latter is held in place. The section 3 is also provided at its free end with the laterally projecting lugs 8, to which are pivotally connected the clamping dogs 9. In the present instance I have shown three clamping dogs 9, but I may use two, or more than three. Each dog 9, which is of crescent shape, is pivotally mounted on two links 10, which latter are pivoted at their opposite ends to the lugs 8, hence the dogs 9 are not only free to rock in the links, but the latter are free to rock with the dogs and thus bring the various sizes of discharge nozzles 5 within the range of clamping movement of the dogs 9. Each dog is normally held in its open position by a spring 11, which is secured to its lug 8 by a screw 12, and bears against the inner faces of the dog at a point in front of the axis of the latter. The rear ends of the dogs rest over and in contact with the rear face of the cone 13, which latter is integral with the ring 14 having threads engaging the external threads on the section 3 of the sleeve 1. This ring may be provided with one or more fixed handles 15, or it may be provided with lugs or recesses to be engaged by a spanner wrench, or it may have recesses for the insertion of a removable handle or bar.

The section 2 of the sleeve 1 is designed for attachment to the coupling of a standard hose 16. This hose has a coupling constructed to be screwed directly to the discharge nozzle of a fire hydrant, and when used with a fire hydrant having the proper coöperating nozzle will be screwed directly thereto without the interposition of my improved coupling, as my coupling is designed primarily for attaching a pipe or hose of one diameter to a nozzle, hose, pipe or other part of a different diameter, or to one having threads of a different size or pitch from those on the coupling of hose 16.

In the operation of my device, the ring 14 should be first turned so as to permit the dogs to open sufficiently for them to pass onto the nozzle 5. After the bearing 4 has made contact with the end of the discharge nozzle 5, the ring 14 is turned in a direction to move the cone 14 rearwardly or away from the dogs 9. The cone in its rearward movement engages the rear ends of the dogs, and forces them outwardly and the outer free ends of the dogs inwardly, the latter turning on their pivotal connections of the links 11, and the latter turning on their pivotal connection with the lugs 8. As the free ends 17 of the lugs engage the threads on nozzle 5, a further movement of the dogs draws the sleeve 1 firmly against the ends of the nozzle 5 and will hold it there against a pressure of three hundred pounds. To release the coupling it is simply necessary to rotate the ring 14 in the opposite direction, thus moving the cone 13 towards the dogs, and permitting them to release their hold on the nozzle 5.

The ends of the dogs 9 may be sharp as shown so as to drop into or back of the threads, or the ends of the dogs may be left flat or blunt and faced with a softer metal which will be forced over and around the teeth, and in either instance securely lock the coupling to the nozzle.

It is evident that many slight changes might be resorted to in the relative arrangement of parts shown and described without departing from the spirit and scope of my invention. Hence I would have it understood that I do not wish o confine myself to the exact construction and arrangement of parts shown and described but, Having fully described my invention, what I claim as new, and desire to secure by Letters-Patent, is:—

1. In a coupling the combination with a threaded sleeve, and dogs pivoted thereto and projecting at one end beyond the sleeve, of a ring cone threaded internally and mounted on the sleeve, the said cone engaging the rear ends of the dogs for turning same on the pivots.

2. In a coupling the combination with a threaded sleeve, dogs pivoted thereto and projecting at one end beyond the sleeve, and springs tending to separate the dogs, of a ring cone threaded internally and mounted on the sleeve, the said cone engaging the rear ends of the dogs and adapted to force their front ends toward each other.

3. In a coupling the combination with a threaded sleeve, links pivoted to the sleeve and dogs pivoted to the links and projecting at their forward ends beyond the sleeve, of a ring cone threaded internally and mounted on the sleeve and engaging the rear ends of said dogs.

4. The combination with a threaded sleeve, links pivoted thereto, dogs pivoted to the links and projecting at their forward ends beyond the sleeve, and springs tending to normally hold the front ends of the dogs apart, of a ring cone threaded internally and engaging the rear ends of the dogs.

5. In a coupling the combination with a sleeve threaded internally, links pivoted to the sleeve and dogs pivoted to the links, of a ring cone threaded internally and mounted on the sleeve the convex face of the cone engaging the inner rear faces of the ends of the dogs.

6. In a coupling the combination with a sleeve having a wide bearing face at one end, a yielding gasket on said bearing face, links pivoted to the sleeve, dogs pivoted to the link and projecting in advance of the sleeve, and springs tending to normally force the free ends of the dogs apart, of a cone ring resting with its convex face against the inner faces of the rear ends of the dogs and means for turning said ring.

In testimony whereof, I have signed this specification in the presence of two subscribing witnesses.

JAMES J. ROLLINS.

Witnesses:
EUGENE G. GOODMAN,
PETER D. BRICKER.